This application relates to the production of purified aluminum bearing materials, such as cell-grade alumina and aluminum sulfate, from sources of sulfate ion, including ferrous sulfate, waste pickle liquor and the like, and from sources of alumina, such as mine waste, aluminum ores and the like.

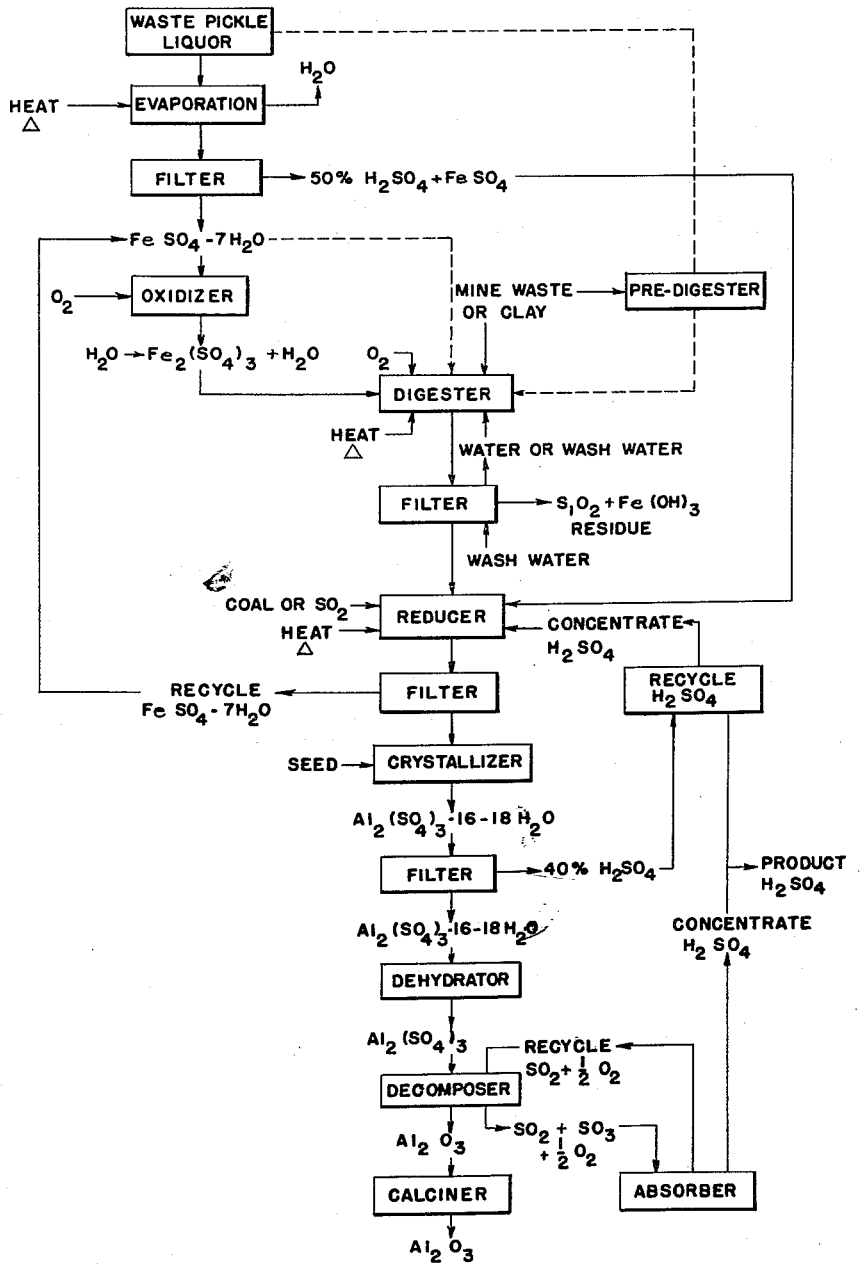
INVENTOR.
ROBERT L. SAVAGE
BY
*Fay & Fay*
ATTORNEYS 3,078,146
METHOD OF PREPARING ALUMINUM SULFATE FROM WASTE SULFATE PICKLE LIQUOR AND ALUMINUM ORE
Robert L. Savage, Willoughby, Ohio, assignor to The North American Coal Corporation, Cleveland, Ohio, a corporation of Ohio
Filed May 27, 1960, Ser. No. 32,375
12 Claims. (Cl. 23—123)

In general in connection with the extraction of alumina and aluminum sulfate from alumina bearing ores, including bauxite and other natural materials, a number of problems exist, in particular that of contamination by ferric material, $Fe_2O_3$, in the purified material, whether it is purified aluminum sulfate or alumina, which is known as cell-grade, and all of these are classified generally as purified aluminum bearing materials.

This invention makes use of clays and coal mine shale, which are sources of alumina, and a source of sulfate ion, such as waste pickle liquor, or any source of ferrous or ferric sulfate, and combines these in a digester in the presence of oxygen so that aluminum sulfate and ferric hydroxide are formed. The ferric hydroxide and other materials are then separated, and the aluminum sulfate is purified into the required aluminum bearing material.

In this invention I propose to take a source of sulfate ion in combination with a source of ferrous and/or ferric ion, more generally the material known as waste pickle liquor or other sources of ferrous sulfate, and oxidize the materials to ferric sulfate, either in a separate reactor or preferably in the digester before the reaction with the aluminum bearing material takes place, maintaining oxidizing conditions so that the ferrous sulfate will oxidize to ferric sulfate. This can be done by blowing air or other oxygen containing materials at the elevated temperatures and pressure required.

The source of aluminum ore, such as mine shale or clay, is then added to the reaction in the presence of oxygen and/or heat, with perhaps from 100 to 5,000 p.s.i. gauge pressure and with from 100 to 350° C. so that substantially all of the ferrous ions are oxidized to ferric ions, and then exchanged with the aluminum bearing materials to form aluminum sulfate and insoluble ferrous hydroxide.

This material is filtered to remove silica and ferric hydroxide, and in a highly acid medium in a separate step any residual ferrous sulfate that is insoluble is filtered off, and the aluminum sulfate crystallized from the solution and purified according to known techniques.

An object of this invention is to provide a new and improved technique for the manufacture of purified aluminum bearing materials, such as cell-grade alumina and aluminum sulfate, from alumina containing ores and waste pickle liquor.

A further object of this invention is to take an inexpensive source of sulfate ion, particularly in the form of waste pickle liquor, and an inexpensive source of sulfuric acid, and combine these in a digester with coal mine waste in such a way as to form aluminum sulfate, and purify the material by removal of the ferrous and ferric ions.

A still further object of this invention is to produce alumina from an aluminum bearing ore and waste pickle liquor.

To the accomplishment of the foregoing and related ends, said invention then consists of the means hereinafter fully described and particularly pointed out in the claims; the following description setting forth in detail but one approved means of carrying out the invention, such disclosed means, however, constituting but one of the various ways in which the principles of the invention may be used.

The accompanying drawing is a schematic diagram showing the manner of operation of this invention and the alternatives possible for producing alumina from mine waste and waste pickle liquor.

In general in connection with the manufacture of alumina, $Al_2O_3$, and aluminum sulfate from alumina containing materials, little use has been made of waste pickle liquor and other ferrous and ferric sulfate sources because of the danger of contamination of $Al_2O_3$. It is particularly important in connection with aluminum metal production to have cell-grade alumina with less than 0.05 percent $Fe_2O_3$, and probably less than 0.03 percent $Fe_2O_3$. This is indeed a stringent requirement because the materials are a major source of the cost involved, and when low-cost materials are used they, in general, contaminate the product.

This invention starts from the worst possible contaminate, that of an iron source, such as waste pickle liquor, which has from 1 to 10 percent sulfuric acid and from 10 to 25 percent ferrous sulfate. Even a very low percentage of $Fe_2O_3$ in connection with cell-grade alumina is undesirable making the product unusable because of the contaminate.

I use waste pickle liquor in connection with this invention and evaporate it, filtering off some of the sulfuric acid and using the ferrous sulfate in an oxidizing medium in order to oxidize it to a ferric sulfate, and then exchange this in a digester under conditions of oxygen from air or from a purified source at reasonably high temperatures, 100 to 350° C., and reasonably high pressures, atmospheric to 5,000 p.s.i. gauge, in order to exchange the ferric sulfate for aluminum sulfate and to produce the silica residue together with ferric hydroxide in large measure.

The silica and ferric hydroxide are filtered off, and there is always a limited amount of ferrous sulfate passing through with the aluminum sulfate. This solution is treated by means of a reducing step in the presence of coal or sulfur dioxide with concentrated sulfuric acid from 35 to 50 percent, preferably from 40 to 47 percent, in the presence of heat so that any ferric sulfate present is reduced in the hot acid solution by bubbling in the $SO_2$ gas or by the coal to insoluble ferrous sulfate,

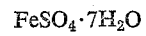
$FeSO_4 \cdot 7H_2O$

At this concentration of acids, the ferrous sulfate has a very low solubility, and it will precipitate out as indicated, and the precipitated ferrous sulfate is filtered out from the hot solution and returned to the ferrous sulfate processing steps indicated earlier so that none of the sulfate ions will be wasted. The relatively pure

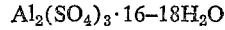
$Al_2(SO_4)_3 \cdot 16\text{--}18H_2O$ may be crystallized by cooling to precipitate the high purity product, which may then be dehydrated and sold as a product or may be used for the production of $Al_2O_3$ by calcination. In the calcination step, $Al_2O_3$ is produced from purified $Al_2(SO_4)_3 \cdot 16\text{--}18H_2O$.

To fully understand this invention, it is necessary to explain the steps of processing as seen in the drawing. A source of sulfate ion, such as waste pickle liquor is treated by evaporation to drive off the water. The slurry is then filtered to produce a more concentrated sulfuric acid, perhaps 50 percent sulfuric acid, plus a limited amount of ferrous sulfate. This can be used later in connection with the reducing step as a source of concentrated acid. The crystals of $FeSO_4 \cdot 7H_2O$ or $FeSO_4 \cdot H_2O$ are treated in the digester, but for convenience are shown herein in two separate steps, in that they are subject to an oxidizing action, such as air, to convert the ferrous sulfate to ferric sulfate, $Fe_2(SO_4)_3$.

This material is then combined with the mine waste or a source of alumina bearing material, such as clay. This is treated with heat at temperatures from 100 to 350° C., preferably 200 to 300° C., and under pressure using oxygen or air from atmospheric to 5,000 p.s.i.g., preferably 100 p.s.i.g. to 3,000 p.s.i.g.

The material is then digested or cracked so that there will be an exchange of ferric ions to form the hydroxide and of aluminum to form aluminum sulfate. Additional water or wash water is added from a filter step and then treated for various lengths of time until the reaction is substantially complete. There is a molal excess of $Fe_2(SO_4)_3$ over the stoichiometric proportions to complete this reaction. The pressure in the container is the partial pressure of the water vapor at the operating temperature plus the pressure of the oxygen or air introduced into the system. This is seen to be within limits, and there is substantial conversion of the ferric sulfate to the ferric hydroxide and a formation of aluminum sulfate.

As an alternate process for these latter steps, the oxidizer and digester steps, it is possible to put the crystals of ferrous sulfate directly into the digester, in which case they are treated for a period of time with air and heat to form ferric sulfate directly, and then the mine shale or clay is added, after which the operation continues until such a time as the conversion is substantially complete. The digested material is then moved to a filter, in which event the silica by-products from the mine shale or clay are filtered off together with the ferric hydroxide residue. The filtrate then includes substantially all aluminum sulfate, together with some impurities, including a limited amount of ferric hydroxide and a lesser amount of ferrous hydroxide. This then is taken to the reducing step with concentrated sulfuric acid and the reducing gas, including sulfur dioxide or coal and heat, to complete the reduction of the ferric ion to ferrous ion. At this concentration the aluminum sulfate is substantially soluble whereas the ferrous sulfate is insoluble and filtered off. The concentration of the sulfuric acid is of the order of 35 to 50 percent acid, more generally 40 to 47 percent. Upon completion of the reaction, the material is filtered and the substantially insoluble ferrous sulfate is recycled into the oxidizer step as shown in the drawing, and the material is then processed through the steps serially shown—the crystallizer, the filter, the dehydrater, the decomposer and the calciner—which are all of the steps required to treat the aluminum sulfate to make it a substantially purified alumina bearing material, and this is meant to include a specific form of cell-grade alumina, $Al_2O_3$, or aluminum sulfate.

To enumerate the steps, it might be said that the acid is diluted and seeded with a crystal of aluminum sulfate, $Al_2(SO_4)_3 \cdot 16-18H_2O$, which causes the sulfate to crystallize out. This is then filtered, the 40 percent or more sulfuric acid is recycled, the crystals are dehydrated and then decomposed. The oxide products are recycled into a sulfuric acid absorber and concentrated sulfuric acid is then used as a by-product or recycled into the reducing step. The $Al_2O_3$ is sent to a calciner where it should be substantialy pure having less than 0.05 percent $Fe_2O_3$ as a contaminate, which is a typically rigid requirement for purified alumina.

An alternate version which may be accomplished in connection with the digester step of this invention is that the material may be any source of alumina, such as mine shale or clay, and if the material is mine waste, it may be necessary to oxidize the mine waste prior to the oxidizing conditions in the digester before using it in the digester in order to maintain the oxidizing condition necessary to convert the ferrous sulfate to ferric sulfate.

It may be, although this is not apparent from the drawing, that both the mine shale and the ferrous sulfate can be put into the digester and the air passed through to oxidize the ferrous sulfate to ferric sulfate and to oxidize a certain amount of the iron contaminates in the mine waste. However, it is apparent that any pyrite in the mine waste can be oxidized to ferrous sulfate and then to ferric sulfate.

In the pretreatment of the mine waste it may be desirable to use, as shown in dotted lines in the drawing, a limited amount of waste pickle liquor in order to neutralize any excess alkalinity in the mine waste. To provide for this step, it may be necessary to remove any coal from the mine waste by a flotation step or if the coal remains when passed from the predigester into the digester, then excess oxygen must be provided to oxidize the coal at the same time.

An important point to note is the versatility of this process or exchange reaction for the conversion of many sources of sulfate, such as waste pickle liquor, although this is meant to include other sources of sulfate, particularly ferrous sulfate, for example, from the production of ilmenite. It can be readily seen that other sources of sulfate ion, particularly those of ferrous sulfate from metal winning and various finishing operations may be useful in connection with this combination.

From the foregoing it is apparent that there is an opportunity for impurities to be removed in several steps, for example, at each of the filtration steps, and particularly in the filtration step following the digestion where the ferric hydroxide and silica residue are removed, and, as well, in the filtering step following reduction. In the final analysis, the purified aluminum bearing material may be substantially pure and has at least less than 0.05 percent $Fe_2O_3$, although it is formed from this material. In the event other undesirable cation impurities are noted, it is possible to remove them by ion exchange means or by bleeding apart of the filtrates, for example, the concentrated sulfuric acid filtrates, if the ion concentration builds up undesirably.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

This application is a continuation-in-part of application, Serial No. 715,629, filed February 17, 1958, now abandoned.

I claim:

1. The method of preparing substantially pure aluminum sulfate which comprises treating waste pickle liquor with an oxygen-containing gas to obtain a solution containing ferric sulfate and digesting a naturally occurring aluminum ore with said solution in an oxidizing atmosphere at a temperature from about 100° C. to 350° C. and a pressure from about atmospheric to 5,000 p.s.i., to form a solution containing aluminum sulfate, filtering said solution and treating the filtrate with a reducing gas and heat in the presence of concentrated sulfuric acid to precipitate any residual ferrous sulfate, filtering said ferrous sulfate from solution and crystallizing from the filtrate a substantially pure aluminum sulfate.

2. The method of claim 1, in which the waste pickle liquor is digested with the aluminum ore in an oxidizing atmosphere at a temperature of 200° C. to 300° C., and a pressure of about 100 p.s.i. to 3,000 p.s.i.

3. The method of claim 1, in which the aluminum ore is coal mine shale.

4. The method of claim 1, in which the aluminum ore is a high-aluminum content clay.

5. The method of claim 1, in which the aluminum ore is pretreated with waste pickle liquor containing ferrous sulfate before it is digested with the solution containing ferric sulfate.

6. The method of claim 1, in which the aluminum ore is coal mine shale from which the coal is removed by froth flotation.

7. The method of claim 1, in which the sulfuric acid has a concentration of about 35 to 50 percent.

8. The method of claim 1, in which the oxygen-containing gas is air.

9. The method of claim 1, in which the reducing gas is sulfur dioxide.

10. The method of claim 1, in which a portion of the acid and water is removed from the waste pickle liquor before treating it with the oxygen-containing gas.

11. The method of claim 1, in which the aluminum ore is coal mine shale.

12. A continuous method of preparing substantially pure aluminum sulfate which comprises treating an acidic solution of waste pickle liquor with an oxygen-containing gas to convert the ferrous sulfate therein to ferric sulfate and digesting a naturally-occurring aluminum ore with said solution in an oxidizing atmosphere at temperatures from about 100° C. to 350° C. under pressures of about 100 p.s.i. to 3,000 p.s.i. to obtain a solution containing aluminum sulfate, filtering said solution and heating the filtrate in the presence of concentrated sulfuric acid and a reducing gas to precipitate any residual iron sulfate, filtering said iron sulfates from said solution and recycling it to the waste pickle liquor while crystallizing from the filtrate a substantially pure aluminum sulfate.

References Cited in the file of this patent

UNITED STATES PATENTS

| | | |
|---|---|---|
| 1,070,300 | Spence et al. | Aug. 12, 1913 |
| 1,300,417 | Laist et al. | Apr. 15, 1919 |
| 1,772,359 | Mitchell | Aug. 5, 1930 |
| 2,296,423 | Clark | Sept. 22, 1942 |
| 2,551,944 | Haff | May 8, 1951 |
| 2,844,439 | Schnurr | July 22, 1958 |
| 2,907,633 | Seidel et al. | Oct. 6, 1959 |